United States Patent [19]
Chiles

[11] 4,339,997
[45] Jul. 20, 1982

[54] AUTOMATIC EMERGENCY ACTIVATED RAILWAY BRAKES

[76] Inventor: David T. Chiles, 1270 E. Main, American Fork, Utah 84003

[21] Appl. No.: 155,137

[22] Filed: Jun. 28, 1980

[51] Int. Cl.³ .............. B61H 11/02; B61H 13/00; B61L 3/00

[52] U.S. Cl. ............................ 105/216; 105/217; 188/33

[58] Field of Search ............ 105/216, 217; 188/33; 295/5, 6

[56] References Cited

U.S. PATENT DOCUMENTS

| | | | |
|---|---|---|---|
| 493,662 | 3/1893 | Spearing | 105/216 X |
| 669,781 | 3/1901 | Giles | 105/216 X |
| 1,426,096 | 8/1922 | Pittman | 105/216 |
| 1,462,254 | 7/1923 | Votaw | 105/216 X |
| 3,535,511 | 10/1970 | Foster et al. | 105/216 X |
| 3,881,672 | 5/1975 | Gittard | 105/217 X |
| 4,269,288 | 5/1981 | Collins | 105/216 X |

Primary Examiner—Joseph F. Peters, Jr.
Assistant Examiner—Howard Beltran
Attorney, Agent, or Firm—Mallinckrodt & Mallinckrodt

[57] ABSTRACT

A railroad car is equipped with air release means in air flow communication with the car train pipe that is normally provided for connection with the air brake train line of a railroad train. Activators for the air release means are associated with respective sets of wheels, at opposite sides of respective wheel trucks of the car and at a height which will clear the corresponding rails of the railroad track during their travel but in positions to engage such rails upon derailment of any corresponding car wheel for operating the air release means, whereby the brakes of the train will be applied automatically upon any derailment. A novel air release valve with activator is preferably employed at respective opposite sides of respective wheel trucks as the air release means.

10 Claims, 10 Drawing Figures

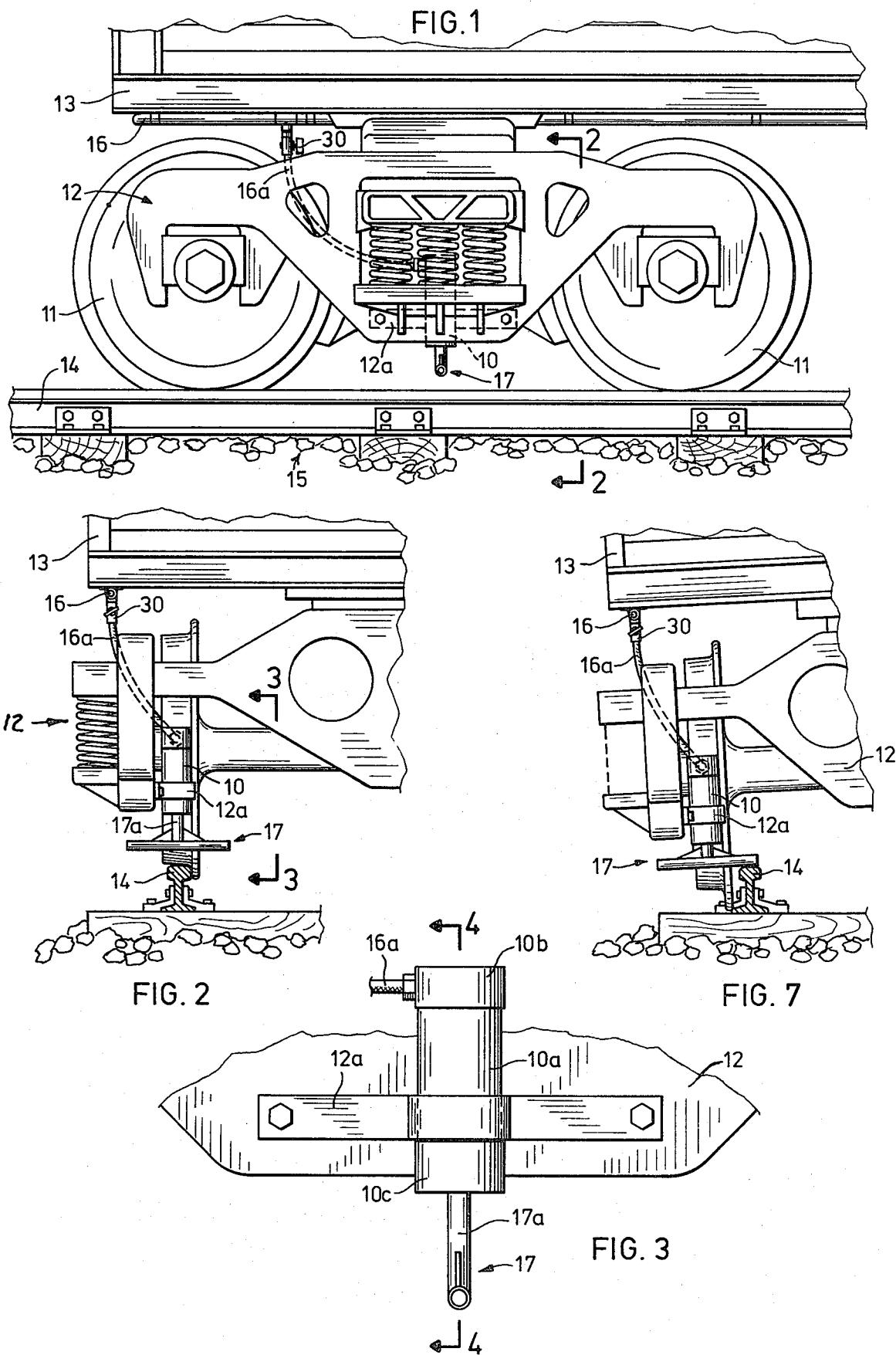

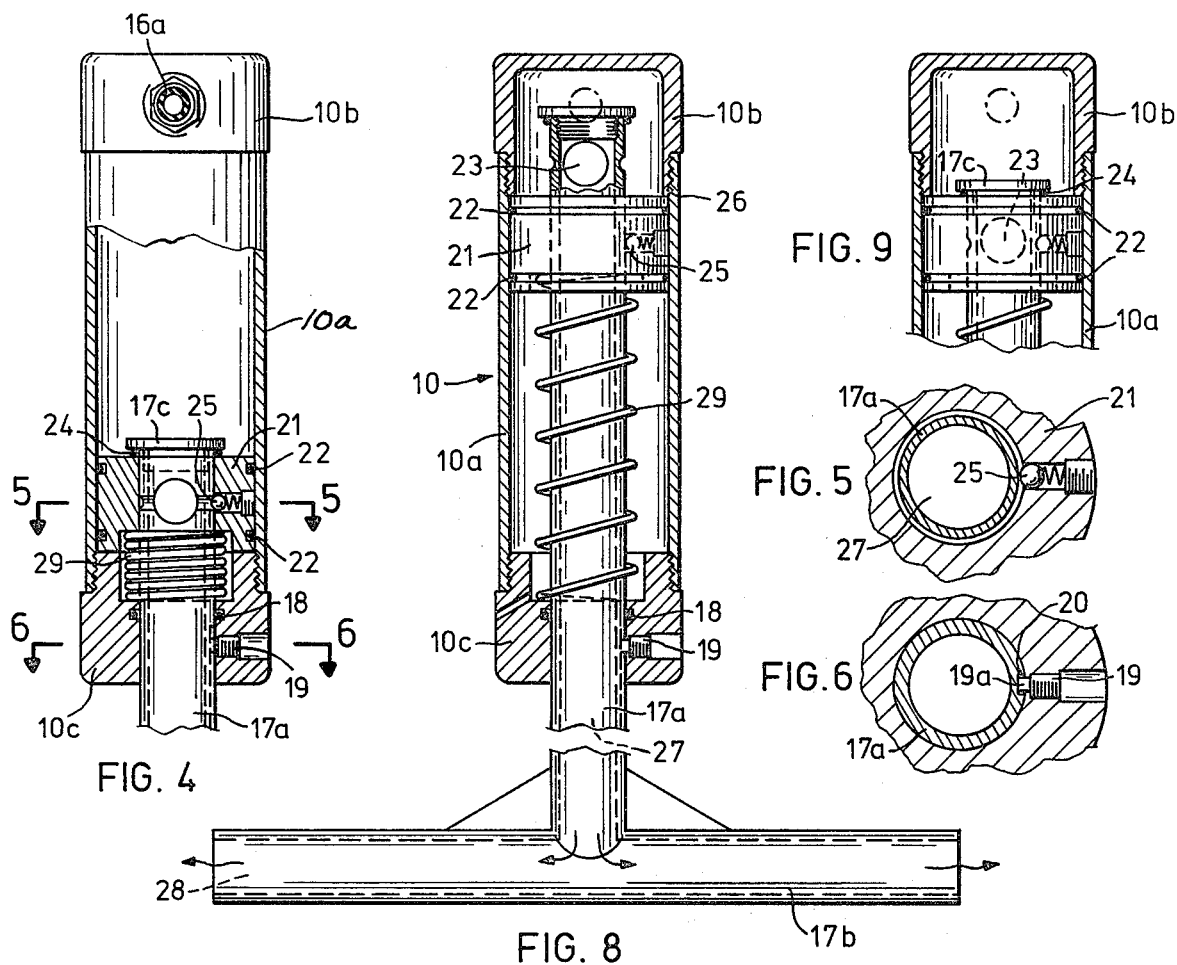
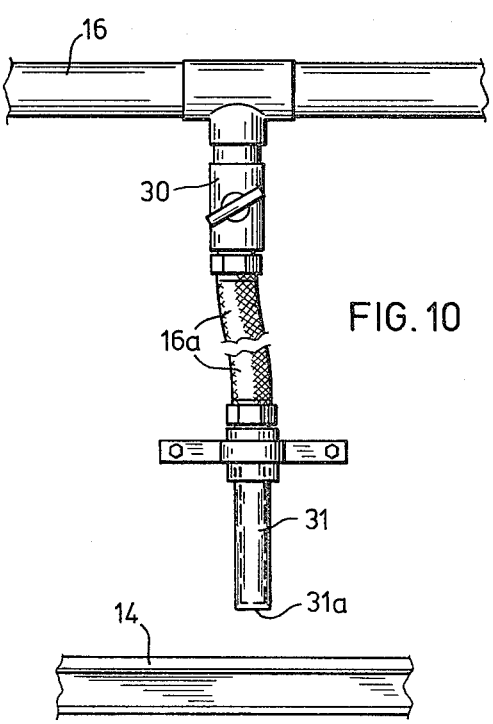

AUTOMATIC EMERGENCY ACTIVATED RAILWAY BRAKES

BACKGROUND OF THE INVENTION

1. Field

The invention is in the field of apparatus for automatically applying the air brakes of a railroad train upon accidental derailments.

2. State of the Art

Accidental derailments of railroad cars, particularly freight cars, in trains of such cars frequently occur and cause tremendous financial losses. The losses are primarily due to the fact that a derailment of one wheel truck of a car usually goes unnoticed until many yards or even miles of track are torn up and many cars of a long train have left the track and have been badly damaged. If the brakes of the train could be automatically applied upon any derailment, the train would be stopped before much real damage could occur. Derailments with tremendous financial losses continue to occur.

3. Objective

It was the principal objective in the making of the present invention to provide effective apparatus for releasing the air in the train pipe of the air brake system of a railroad train upon derailment of any wheel of any car of the train.

SUMMARY OF THE INVENTION

In accordance with the invention, activators for air release means operatively connected with the air brake train pipe of a railroad car, are positioned in association with opposite sides of the wheel trucks of the car, so as to be at a safe rail clearance level above the corresponding rail of the railroad track during normal train travel, but so as to drop with any respectively relevant derailment-drop of the wheel truck to activating engagement with the corresponding rail of such track.

The air release means and activators may take the form of normally closed air release valves which are arranged to be opened when dependent, activator stems thereof drop into engagement with a respectively corresponding rail of the railroad track and are pushed upwardly as the respectively corresponding wheels of the wheel truck drop to tie level. Again, they may take the form of dependent, break-off pipes having closed lower ends so as to normally prevent the escape of air from the train line of the air brake system of the train but so as to break off and open such train line for the release of air upon hitting the rail when there is a respectively relevant derailment. Other functionally similar means may also be employed, as for example a solenoid-operated air release valve and a plurality of electrical switch activators therefor, it being realized that immediate release of air from the train line of the air brake system upon derailment is the important thing.

Upon correction of the derailment, the air release valve or valves may be reset manually to closed position, or the remains of the broken break-off pipe or pipes can be unscrewed or otherwise released from air flow communication with the train pipe and replaced with new break-off pipe or pipes.

An advantageous air release valve for the purpose is constructed with an inverted T-shaped, tubular, activator stem arranged with respect to an elongate and hollow valve body such that the crosspiece of the T extends transversely of the rail when the valve body is secured to the frame of a wheel truck of a railroad car. The leg of the inverted T extends upwardly and is slidable within the valve body and has slidably mounted thereon a piston which seals against the inner cylindrical wall of the valve body and prevents escape of air around the piston. The upper end of the leg of the T is provided with an opening serving as an air exhaust port leading into the tubular interior of the T and a pipe or hose is adapted to connect the upper end of the interior of the valve body with the train pipe of the railroad car. A spring normally urges the piston and inverted T stem to a high clearance position when the train pipe of the car is disconnected from the air brake train line of a train, as when the car is in a retarder/switching yard for one reason or another. However, when the train pipe of the car is connected into the air brake train line of a train, air pressure acting against the spring pushes the inverted T stem and the piston down to a travel rail-clearance position wherein the exhaust port is sealed closed by the piston. Upon activation of the valve on derailment of a wheel with which the valve is associated in a wheel truck of the car, the inverted T stem is pushed upwardly beyond a maximum raised position of the piston to expose the exhaust port to the interior of the valve body above the piston, whereby air is immediately exhausted from the train line, resulting in automatic setting of the air brakes of the train and prompt stopping of the train.

THE DRAWINGS

In the drawings, which exemplify the best mode presently contemplated for carrying out the invention in practice:

FIG. 1 is a fragmentary view in side elevation of one end portion of a railroad car in normal travel position on a railroad track, showing one side of the wheel truck at that end of the car with an air release valve installed on the frame of the truck at that side of the car in accordance with the invention;

FIG. 2, a fragmentary, transverse, vertical section taken on the line 2—2 of FIG. 1;

FIG. 3, a fragmentary, longitudinal, vertical section taken on the line 3—3 of FIG. 2 and drawn to a larger scale;

FIG. 4, an axial vertical section taken on the line 4—4 of FIG. 3 and drawn to a still larger scale, the lower part of the inverted T stem of the valve being broken off for convenience of illustration;

FIG. 5, a horizontal section taken on the line 5—5 of FIG. 4 and drawn to a somewhat larger scale;

FIG. 6, a similar view taken on the line 6—6 of FIG. 4;

FIG. 7, a view corresponding to that of FIG. 2 but showing a derailment of a corresponding wheel of the wheel truck with valve activating inverted T stem pushed up to open the valve and release the air from the train line of the air brake system of the train;

FIG. 8, a view corresponding to that of FIG. 4 but including the lower crosspiece of the inverted T stem and showing the valve in open activated position corresponding to the derailed position of the wheel truck as illustrated in FIG. 7;

FIG. 9, a fragmentary view corresponding to those of FIGS. 4 and 8 but showing only the upper end portion of the valve with inverted T stem raised by spring urging alone to a high clearance running position relative to the lower travel position of FIG. 4 for avoiding retarder devices in a usual railroad retarder/switching yard; and FIG. 10, an enlarged side elevation showing the train pipe and a break-off pipe utilized as a combined air-release device and activator.

DETAILED DESCRIPTION OF ILLUSTRATED EMBODIMENT

In the embodiment illustrated by FIGS. 1-9, the air release means takes the form of air release valves 10 associated with the sets of wheels 11 at opposite sides of respective standard wheel trucks 12 of a railroad car 13, which is shown in normal traveling position on the rails 14 of a railroad track 15. Brackets 12a firmly and immovably secure the respective valves in position on the wheel trucks 12.

Each of the air release valves 10 is operatively connected, as by a flexible hose 16a, in air flow communication with the train pipe 16 of car 13, which is adapted to be connected into the usual air brake line of a railroad train that includes such car 13, and each valve is provided with a valve activator 17 normally positioned well above the corresponding rail 14, as shown in FIG. 1 or 2, for train travel.

Valve 10 comprises an air tight valve body, here shown as made up of a tubular portion 10a, FIGS. 4, 8, and 9, having upper and lower ends closed by caps 10b and 10c, respectively. Train pipe hose 16a communicates with the upper interior of the valve body through a secure connection with upper end cap 10b.

As shown, valve activator 17 is of inverted hollow T formation, having an upper stem member 17a that slidably extends into the interior of the valve body through lower end cap 10c, there being an O-ring gasket 18 for sealing against escape of air from the interior of the valve body. A set screw 19 has a tip 19a fitted into a groove 20 that extends longitudinally of the stem member 17a so as to maintain crosspiece member 17b of activator 17 crosswise of the corresponding rail 14 at all times.

Slidably mounted on stem member 17a of valve activator 17 is a piston 21 having air seal rings 22. Such piston abuts against a limit stop flange 17c at the upper end of stem member 17a and, during normal train travel as in FIG. 4, seals off an exhaust port 23 provided laterally in such stem member for the purpose of establishing communication between the interior of the valve body and the hollow interior of the stem member upon derailment of a wheel 11 of the corresponding set of same on the corresponding wheel truck 12. Both the valve activator 17 and piston 21 are pushed down to the position of FIG. 4 and kept down in such position during normal train travel by pressure air from the air brake system of the train. An O-ring 24 is provided to prevent escape of pressure air into the lower part of the valve body, and 21 is normally constrained to maintain this position at the upper end of stem portion 17a by reason of a detent 25.

Upon derailment of a wheel 11 of the corresponding set of same of the corresponding wheel truck 12 of the railroad car 13, the drop of such wheel truck lowers valve 10 so that cross-piece 17b of valve activator 17 engages the corresponding rail 14, as in FIG. 7, and pushes stem member 17a and piston 21 into the air exhaust position of FIG. 8, it being noted that upper cap 10b of the valve body provides a limit stop 26 for piston 21 so that stem member 17a can continue upwardly relative thereto and expose exhaust port 23 to the upper interior of the valve body and so release the pressure air from the car train pipe and, thus, from the air brake system of the train, whereupon the brakes of the train will be automatically set to stop the train. Escape of pressure air is through the hollow interiors 27 and 28 of the tubular stem member 17a and of cross-piece 17b, respectively, and through the open ends of such crosspiece.

Following correction of the derailment, valve activator 17 is manually pulled down to the train travel position of FIG. 4 so that air pressure will again build up in the air brake system of the train.

It is desirable that provision be made for raising valve activator 17 from the normal train travel position of FIG. 4 to a higher running position for avoiding retarder devices in the usual railroad retarder yard. For this purpose, resilient means in the form of a coil spring 29 is provided within the valve body for urging piston 21 and valve activator 17 upwardly to the piston limit stop 26, see FIG. 9, when there is no operating air pressure in the train pipe 16 of the car, it being realized that such train pipe is not connected to an air brake system when the car is being moved from place to place in a retarder/swiching yard.

A possible though, as presently contemplated, less desirable form of air release means comprise break-off pipes 31, FIG. 10, associated, as are the valves 10, with the sets of wheels 11 at opposite sides of wheel trucks 12. The capped lower portions 31a of such pipes constitute activators and are broken off when dropped by derailment into engagement with the corresponding rail 14 of the railroad track, it being realized that such pipes are wholly or partially made of a frangible material such as a brittle plastic.

It is desirable to provide for cutting out of the system any of the air relase valves 10 or break-off pipes 31 which may become damaged. For this purpose, it is advantageous to provide shut-off valves 30 to close air flow communication between the train pipe of the car and the respective air release devices.

Other forms of the invention will be obvious to those skilled in the art. For example, as previously indicated, a single, solenoid operated, air release valve may be incorporated directly in the train pipe of each railroad car for control by activators operable similarly to those aforedescribed but with respect to respective electrical switches in circuit with the solenoid of the air release valve.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A railroad car which will automatically stop a railroad train in which it is included upon derailment of the car, comprising in combination with a railroad car structure having wheel trucks and a train pipe for connection with the air brake train line of a railroad train, air release devices operatively connected with the train pipe and positioned in association with respective wheel trucks of the car structure, said air release devices including respective activators therefor normally positioned under the influence of pressure air at a safe rail-clearance level above the corresponding rail of a railroad track upon which the railroad train is adapted to run but so as to drop with any respectively relevant derailment-drop of the wheel truck to activating engagement with the corresponding rail of the railroad track, and including respective means for automatically raising said activators a sufficient distance above the normal running positions thereof to clear retarder devices in a railroad retarder yard when operating air pressure in the train pipe is lacking.

2. A railroad car in accordance with claim 1, wherein each of the air release devices is an air release valve having a valve body in air flow communication with the train pipe of the car and secured to the wheel truck with which the valve is associated; wherein the activator thereof is a valve stem whose upper end portion is movable upwardly and downwardly within the valve body and is arranged to control release of air from said train pipe, the lower end portion thereof being formed to engage the underlying rail of the railroad track upon derailment of a corresponding wheel of the wheel truck; and wherein the means for raising said activator is a spring operable on said valve stem to urge it upwardly when operating air pressure is lacking in said train pipes.

3. A railroad car in accordance with claim 2, wherein the valve and activator therefor of each device are mounted so as to be directly over the corresponding rail of the railroad tracks, and the activator is sufficiently broad to engage the rail upon derailment at either side of said rail.

4. Apparatus for automatically stopping a railroad train upon derailment, comprising an air release device adapted to be operatively connected with the air brake train line of a potentially derailable car of the train and to be positioned in association with a set of the wheels at a side of a wheel truck of the car, said air release device being an air release valve including an activator therefor adapted to be normally positioned under the influence of air pressure in said train line at a safe rail-clearance level above the corresponding rail of the railroad track upon which the car is positioned but so as to drop with any relevant derailment-drop of a wheel of the said set of wheels to activating engagement with said corresponding rail of the railroad track, said air release valve comprising a valve body adapted to have its upper end connected to the train pipe in air flow communication therewith and to be secured to the wheel truck, said activator having a hollow valve stem whose upper end is closed and whose upper end portion is positioned in said valve body so as to be movable upwardly and downwardly therewithin, said valve stem having a laterally-positioned exhaust port adjacent to its closed upper end; an air-sealing piston slidable within the valve body on the upper portion of the valve stem for closing said exhaust port when both piston and valve stem are forced down to normal travel positions by air pressure from the train pipe; and stop means within the valve body for limiting upward travel of the piston upon activation of said valve stem on derailment, so said valve stem will travel upwardly relative to said piston and expose said exhaust port for release of train pipe air, there being at least one exhaust port in the hollow stem outside of the valve body.

5. Apparatus in accordance with claim 4, wherein the activator of the air release device includes means for automatically raising said activator a sufficient distance above the normal running position to clear retarder devices in a railroad retarder yard.

6. Apparatus in accordance with claim 4, wherein the activator for the air release device is of inverted T formation.

7. Apparatus in accordance with claim 4, wherein resilient means are provided within the valve body for urging the valve stem to a running position higher than normal travel position when operating air pressure is lacking in the train pipe so as to clear retarder devices in a railroad retarder yard.

8. Apparatus in accordance with claim 7, wherein additional stop means for the piston is provided at the upper end of the valve stem so as to limit upward travel of the piston relative to the valve stem, the resilient means being a spring active on said piston.

9. Apparatus in accordance with claim 8, wherein detent means is provided between valve stem and piston for normally interconnecting piston and valve stem for movement in common but for releasing the valve stem for further upward travel beyond the stop position of the piston on derailement activation of the air release device.

10. In combination with a railroad car having wheel trucks with sets of wheels at opposite sides thereof and a train pipe for connection with the air brake train line system of a railroad train, apparatus for stopping the train upon derailment of a wheel of a wheel truck of the railroad car; comprising an air release device adapted to be operatively connected with the air brake train line of a potentially derailable car of the train and to be positioned in association with a set of the wheels at a side of a wheel truck of the car, said air release device being an air release valve including an activator therefor adapted to be normally positioned under the influence of air pressure in said train line at a safe rail-clearance level above the corresponding rail of the railroad track upon which the car is positioned but so as to drop with any relevant derailment-drop of a wheel of the said set of wheels to activating engagement with said corresponding rail of the railroad track, said air release valve comprising a valve boby adapted to have its upper end connected to the train pipe in air flow communication therewith and to be secured to the wheel truck, said activator having a hollow valve stem whose upper end is closed and whose upper end portion is positioned in said valve body so as to be movable upwardly and downwardly therewithin, said valve stem having a laterally-positioned exhaust port adjacent to its closed upper end; an air-sealing piston slidable within the valve body on the upper portion of the valve stem for closing said exhaust port when both piston and valve stem are forced down to normal travel positions by air pressure from the train pipe; and stop means within the valve body for limiting upward travel of the piston upon activation of said valve stem on derailment, so said valve stem will travel upwardly relative to said piston and expose said exhaust port for release of train pipe air, there being at least one exhaust port in the hollow stem outside of the valve body.

* * * * *